United States Patent
Lu

(10) Patent No.: US 9,172,262 B2
(45) Date of Patent: Oct. 27, 2015

(54) CHARGING DEVICE AND CHARGING SYSTEM

(75) Inventor: Cheng-Huang Lu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 989 days.

(21) Appl. No.: 13/282,057

(22) Filed: Oct. 26, 2011

(65) Prior Publication Data

US 2013/0049681 A1 Feb. 28, 2013

(51) Int. Cl.
 H02J 7/00 (2006.01)
 H01R 11/30 (2006.01)

(52) U.S. Cl.
 CPC .................................. *H02J 7/0031* (2013.01)

(58) Field of Classification Search
 CPC ........................... Y02E 60/12; H01R 13/6205
 USPC ............................................. 320/114; 439/39
 See application file for complete search history.

(56) References Cited

U.S. PATENT DOCUMENTS

| | | | |
|---|---|---|---|
| 7,351,066 B2 * | 4/2008 | DiFonzo et al. | 439/39 |
| 8,016,600 B2 * | 9/2011 | Li | 439/39 |
| 8,388,353 B2 * | 3/2013 | Kiani et al. | 439/39 |
| 8,564,243 B2 * | 10/2013 | Chen et al. | 320/108 |
| 8,777,634 B2 * | 7/2014 | Kiani et al. | 439/39 |

* cited by examiner

*Primary Examiner* — Edward Tso
*Assistant Examiner* — Ahmed Omar
(74) *Attorney, Agent, or Firm* — Novak Druce Connolly Bove + Quigg LLP

(57) ABSTRACT

A charging device includes a power adapter, a cable assembly, and a control module. The power adapter is used for converting a power supplied from an external power source to a form suitable for charging a battery of an electronic device. The power adapter includes a first magnetic element. The cable assembly is used for electrically connecting the power adapter with the electronic device such that the battery can be charged. The cable assembly includes a first plug connected to the power adapter and a second magnetic element disposed in the first plug. The control module is used for controlling the first magnetic element and the second magnetic element to engage with each other to disconnect the first plug from the power adapter when the battery has been fully recharged.

17 Claims, 2 Drawing Sheets

CHARGING DEVICE AND CHARGING SYSTEM

BACKGROUND

1. Technical Field

The present disclosure relates to a charging device and a charging system using the charging device.

2. Description of Related Art

Many electronic devices such as mobile phones or personal digital assistances can be recharged via a charger. When the electronic devices are fully charged, warning information may be displayed in a display of the electronic device to inform the users. However, if users do not pay attention to the warning information and do not unplug the electronic device, charging will continue. This may result in waste, and possibly damage to the electronic device.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
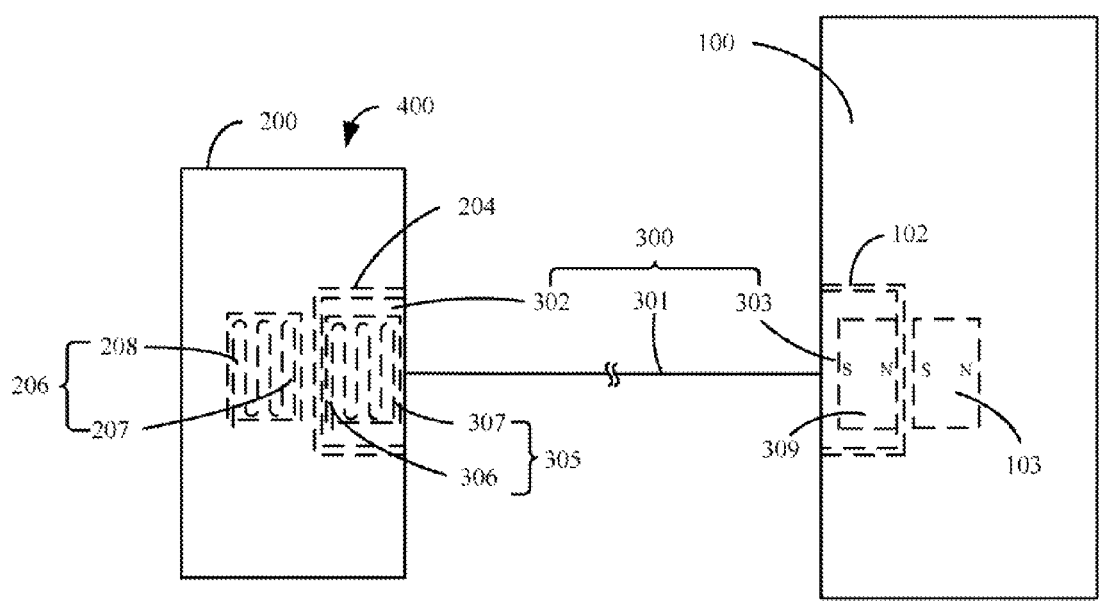
FIG. 1 is a schematic view of a charging system according to an embodiment of the present disclosure.

Referring to FIG. 1, a charging system 10 includes an electronic device 100 and a charging device 400 for charging the electronic device 100. In some embodiments, the electronic device 100 may be a mobile phone.

Figure 2:
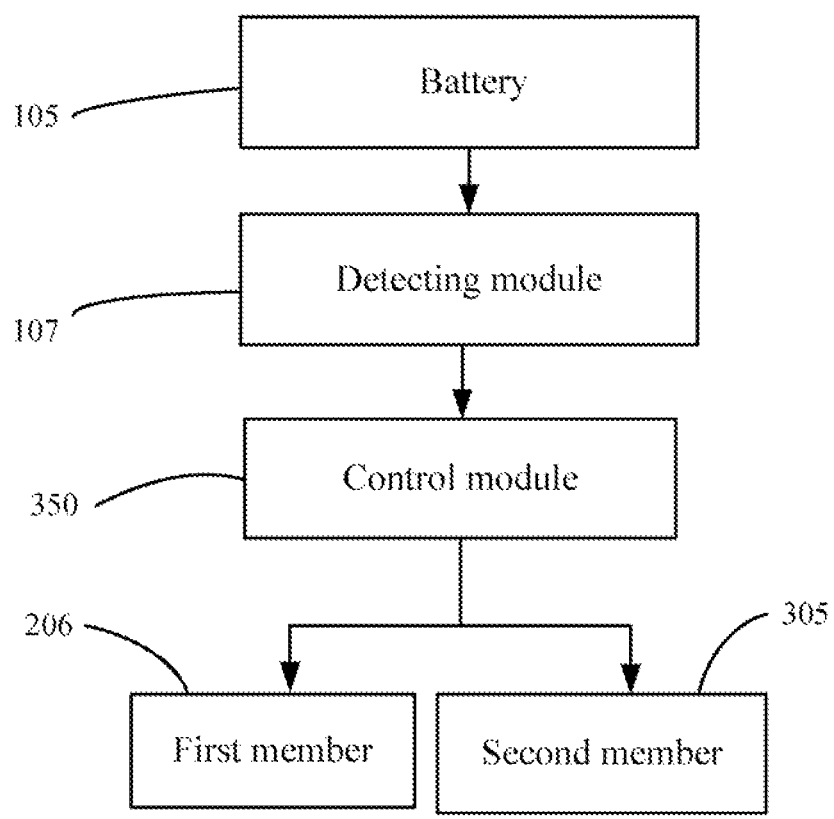
FIG. 2 is a block diagram of the charging system of FIG. 1.

Referring also to FIG. 2, the electronic device 100 includes a first socket 102 connected to the charging device 400, a first magnet 103, a battery 105, and a detecting module 107. The first socket 102 receives a first plug of the charging device 400. The first magnet 103 is arranged inside the electronic device 100 and adjacent to the first socket 102, with one magnetic pole thereof attracted to the opposite pole of a magnet within the first plug of the charging device 400. In an embodiment, the S pole of the first magnet 103 corresponds to the first plug of the charging device 400. The battery 105 is electrically connected to an external power source via the charging device 400. In the embodiments, the battery 105 is a rechargeable battery having a maximum coulomb when fully charged.

The detecting module 107 is electrically connected to the battery 105 for detecting the remaining energy within the battery 105. The detecting module 107 generates a detecting signal via the first socket 102 when the battery 105 is fully charged.

The charging system 10 includes a power adapter 200 and a cable assembly 300. The power adapter 200 can be electrically connected to an external power source for converting power from the power source to a working power suitable for the battery 105. One side of the power adapter 200 is recessed to define a second socket 204 for receiving a second plug of the charging device 400. The power adapter 200 further includes a first magnetic element 206 arranged in the power adapter 200 and adjacent to the second socket 204. The first magnetic element 206 includes a first end portion 207 corresponding to the second plug of the charging device 400 and a second end portion 208 opposite to the first end portion 207. In the embodiment, the first magnetic element 206 is an electromagnet; when the current flows in a first direction, the first magnetic element 206 is magnetized with the first end portion 207 being the N pole and the second end portion 208 being the S pole; and when the current flows in a second direction (the reverse of the first direction), the first magnetic element 206 is also magnetized, but with the first end portion 207 being the S pole and the second end portion 208 being the N pole.

The cable assembly 300 electrically connects the first socket 102 and the second sockets 204. The cable assembly 300 includes a cable 301, a first plug 302 insertable into the second socket 204 of the power adapter 200, a second plug 303 insertable into the first socket 102 of the electronic device 100, a second magnetic element 305, and a second magnet 309. The first plug 302 and the second plug 303 are arranged at opposite ends of the cable 301. The second magnetic element 305 is disposed in the first plug 302, and includes a third end portion 306 and a forth end portion 307 arranged in that order along the inserting direction of the first plug 302. The third end portion 306 is capable of corresponding to the first end portion 207 when the first plug 302 is inserted in the second socket 204. In the embodiment, the second magnetic element 305 is also an electromagnet, which is magnetized by an electrical current, and the poles thereof are reversed when the current supplied flows in the reverse direction. The second magnet 309 is disposed inside the second plug 303, with the two magnetic poles thereof arranged in order along the inserting direction of the second plug 303. In the illustrated embodiment, the N pole of the second magnet 309 is disposed in a forward position and the S pole of the second magnet 309 is disposed at the rear along the inserting direction of the second plug 303, and the N pole of the second magnet 309 corresponds to the N pole of the first magnet 103 when the second plug 303 is inserted in the first socket 102.

The charging device 400 further includes a control module 350. The control module 350 may receive the detecting signal from the detecting module 107, and once received, may generate a control signal in response, to control the first magnetic element 206 to interact with the second magnetic element 305 in such a way that the charging device 400 is disconnected from the external power source.

When the electronic device 100 is to be charged, the first plug 302 is inserted into the second socket 204 of the power adapter 200. The first end portion 207 of the first magnetic element 206 is thus adjacent to the third end portion 306 of the second magnetic element 305. The second plug 303 is inserted into the first socket 102 of the electronic device 100. In this state, the S pole of the second magnet 309 corresponds to the N pole of the first magnet 103, therefore, the second plug 303 is pulled into the first socket 102 by means of the magnetism generated between the first and second magnets 103 and 309.

After the charging device 400 is connected to the external power source, the battery 105 of the electronic device 100 is charged via the charging device 400. From this time, the detecting module 107 detects the remaining coulomb of the battery 105 and generates a detecting signal if and when the battery 105 is fully recharged. The control module 350 receives the detecting signal and generates a control signal to supply two currents, of reverse directions, to flow through the first magnetic element 206 and the second magnetic element 305. As such, the first magnetic element 206 and the second magnetic element 305 are magnetized and a repulsive force is produced between the first and second magnetic elements 206 and 305 so as to pop the first plug 302 out of the power adapter 200. The power adapter 200 in this state is thus disconnected from the cable assembly 300 at the finish of the charging process. In some embodiments, after the first and second magnetic elements 206 and 305 are magnetized, the first end portion 207 of the first magnetic element 206 and the third end portion 306 of the second magnetic element 305 all become a magnetic S pole. In another embodiment, the first end portion 207 and the third end portion 306 may all become the N pole of a magnet(s).

It should be noted that in other embodiments, one of the first magnetic elements 206 and the second magnetic elements 305 may be a permanent magnet and the other one may be an electromagnet. As such, a repulsive force can also be produced between the first magnetic element 206 and the second magnetic element 305 when a current is flowing through the electromagnet. For example, the first magnetic element 206 may be a magnet and the first end portion 207 thereof is the S pole, and the second magnetic element 305 is an electromagnet. When receiving the detecting signal, the control module 350 may allow a current to flow through the second magnetic element 305 to magnetize the second magnetic element 305. In this state, the third end portion 306 of the second magnetic element 305 may also become the S pole of a magnet.

With the assistance of the control module 350, the first magnetic element 206 and the second magnetic element 305 are capable of being magnetized when the battery 105 is fully charged, to bring about the disconnection of the cable assembly 300 from the power adapter 200 to finish the charging process, therefore, any waste of power and the possibility of damage to the electronic device 100 is minimized. Additionally, with the assistance of the first magnet 103 and the second magnet 309, the cable assembly 300 can be inserted into the electronic device 100 and thus connected conveniently and quickly.

It is to be understood, however, that even though information and the advantages of the present embodiments have been set forth in the foregoing description, together with details of the structures and functions of the present embodiments, the disclosure is illustrative only; and that changes may be made in detail, especially in the matters of shape, size, and arrangement of parts within the principles of the present embodiments to the full extent indicated by the broad general meaning of the terms in which the appended claims are expressed.

What is claimed is:

1. A charging device, comprising:
    a power adapter for converting a power supplied from an external power source such that the power can charge a battery of an electronic device; the power adapter comprising a first magnetic element;
    a cable assembly for electrically connecting the power adapter with the electronic device, the cable assembly comprising a first plug insertable into the power adapter and a second magnetic element disposed in the first plug, the second magnetic element corresponding to the first magnetic element; and
    a control module for controlling the first magnetic element and the second magnetic element to be interacted with each other to disconnect the first plug with the power adapter when the electronic device is fully recharged;
    wherein the control module further controls the interaction between the first magnetic element and the second magnetic element to be removed when the electronic device is being recharged.

2. The charging device as claimed in claim 1, wherein a repulsing force is produced between the first magnetic element and the second magnetic element to disconnect the first plug from the power adapter.

3. The charging device as claimed in claim 2, wherein both first magnetic element and the second magnetic element are electromagnets which are magnetized to disconnect the first plug from the power adapter when the battery is fully charged.

4. The charging device as claimed in claim 3, wherein the first magnetic element includes a first end portion, the second magnetic element includes a second end portion corresponding to the first end portion, and the first end portion and the second end portion have the same magnetism under the control of the control module when the battery is fully charged.

5. The charging device as claimed in claim 2, wherein one of the first magnetic element and the second magnetic element is a magnet, the other one of the first magnetic element and the second magnetic element is an electromagnet.

6. The charging device as claimed in claim 5, wherein the first magnetic element is a magnet, the second magnetic element is an electromagnet and is magnetized under the control of the control module to allow a repulsing force to be produced between the first magnetic element and the second magnetic element when the battery is fully charged.

7. The charging device as claimed in claim 1, wherein the cable assembly further comprises a second plug connected to the electronic device, the electronic device comprises a socket for receiving the second plug, two magnets of opposite magnetism are respectively arranged in the second plug and in the socket to produce an attracting force to the second plug.

8. A charging system, comprising:
    an electronic device comprising a battery and a detecting module connected to the battery for detecting remaining coulomb of the battery and generating a detecting signal when the remaining coulomb reaches a maximum coulomb;
    a power adapter for converting a power supplied from an external power source such that the power can charge the battery;
    a cable assembly for electrically connecting the power adapter with the electronic device, the cable assembly comprising a first plug connected to the power adapter;
    wherein the power adapter further comprises a first magnetic element, the cable assembly further comprises a second magnetic element disposed in the first plug and corresponding to the first magnetic element, the charging system further comprises a control module for controlling the first magnetic element and the second magnetic element to interact with each other to disconnect the first plug from the power adapter when the electronic device is fully recharged; the control module further controls the interaction between the first magnetic element and the second magnetic element to be removed when the electronic device is being recharged.

9. The charging system as claimed in claim 8, wherein a repulsing force is produced between the first magnetic element and the second magnetic element to disconnect the first plug from the power adapter.

10. The charging system as claimed in claim 9, wherein both first magnetic element and the second magnetic element are electromagnets and magnetized to disconnect the first plug from the power adapter when the battery of the electronic device is fully charged.

11. The charging system as claimed in claim 8, wherein the first magnetic element includes a first end portion, the second magnetic element includes a second end portion corresponding to the first end portion, and the first end portion and the second end portion have the same magnetism under the control of the control module when the battery is fully charged.

12. The charging system as claimed in claim 8, wherein one of the first magnetic element and the second magnetic element is a magnet, and the other one is an electromagnet.

13. The charging system as claimed in claim 12, wherein the first magnetic element is an electromagnet and the second magnetic element is a magnet, the first magnetic element is magnetized under the control of the control module to allow a repulsing force to be produced between the first magnetic element and the second magnetic element when the battery is fully charged.

14. The charging system as claimed in claim 8, wherein the cable assembly further comprises a second plug connected to the electronic device, the electronic device comprises a socket for receiving the second plug, two magnets of opposite magnetism are respectively arranged in the second plug and in the socket to attract the second plug to be inserted into the socket.

15. A charging device, comprising:
   a power adapter for converting a power supplied from an external power source such that the power can charge a battery of an electronic device; the power adapter comprising a first magnetic element;
   a cable assembly for electrically connecting the power adapter with the electronic device, the cable assembly comprising a first plug insertable into the power adapter and a second magnetic element disposed in the first plug, the second magnetic element corresponding to the first magnetic element; and
   a control module for generating a current passing through the second magnetic element to magnetize the second magnetic element;
   wherein a repulsing force is produced between the first magnetic element and the magnetized second magnetic element to disconnect the first plug with the power adapter; the control module generates a current passing through the first magnetic element to magnetize the first magnetic element; a direction of the current passing through the first magnetic element is opposite to a direction of the current passing through the second magnetic element; the control module stops generates the current passing through the second magnetic element when the electronic device is being recharged.

16. The charge device of claim 15, wherein the control module further stops generating the current passing through the second magnetic element; the repulsing force is removed between the first magnetic element and the second magnetic element.

17. The charge device of claim 15, wherein the control module generates the current passing through the second magnetic element when the electronic device is fully recharged.

* * * * *